United States Patent
Donaghey et al.

(10) Patent No.: US 6,941,355 B1
(45) Date of Patent: Sep. 6, 2005

(54) SYSTEM FOR SELECTING AND DISSEMINATING ACTIVE POLICIES TO PEER DEVICE AND DISCARDING POLICY THAT IS NOT BEING REQUESTED

(75) Inventors: Robert J. Donaghey, Lexington, MA (US); Sandra E. Carielli, Somerville, MA (US); Pamela Helinek, Framingham, MA (US)

(73) Assignee: BBNT Solutions LLC, Cambridge, MA (US)

(*) Notice: Subject to any disclaimer, the term of this patent is extended or adjusted under 35 U.S.C. 154(b) by 637 days.

(21) Appl. No.: 09/658,207

(22) Filed: Sep. 8, 2000

(51) Int. Cl.[7] ............................................. G06F 15/177

(52) U.S. Cl. ..................... 709/220; 709/221; 709/223; 709/224

(58) Field of Search ............................... 709/223, 224, 709/238, 316, 220, 221; 370/428, 229; 713/201, 713/1; 705/7

(56) References Cited

U.S. PATENT DOCUMENTS

| | | | | |
|---|---|---|---|---|
| 5,918,210 A | * | 6/1999 | Rosenthal et al. | 705/7 |
| 5,968,176 A | * | 10/1999 | Nessett et al. | 713/201 |
| 6,286,052 B1 | * | 9/2001 | McCloghrie et al. | 709/238 |
| 6,442,620 B1 | * | 8/2002 | Thatte et al. | 709/316 |
| 6,473,851 B1 | * | 10/2002 | Plutowski | 713/1 |
| 6,539,026 B1 | * | 3/2003 | Waclawsky | 370/428 |
| 6,578,076 B1 | * | 6/2003 | Putzolu | 709/223 |
| 6,628,610 B1 | * | 9/2003 | Waclawsky et al. | 370/229 |

* cited by examiner

Primary Examiner—Le Hien Luu
(74) Attorney, Agent, or Firm—Ropes & Gray LLP (57) ABSTRACT

A method ensures that a set of anonymous peer devices (110) and anonymous policy servers (120) in a system (100) are apprised of all current versions of a policy so that they can quickly implement a version of the policy as it becomes active. The method includes determining whether new versions or a newly active version of a policy exists and generating a message containing the newly received or newly active policy version(s). The method also includes transferring the message to the peer devices (110), the transfer being initiated by either the sender or the receiver.

8 Claims, 8 Drawing Sheets

| POLICY CLASS 310 | VERSION 320 | DATE 330 | TIME 340 | POLICY CONTENT 350 |
| --- | --- | --- | --- | --- |
| PRINTER ACCESS | A | 06/05/00 | 18:34:22.136 | POLICY CONTENT |
| PRINTER ACCESS | B | 06/08/00 | 08:08:12.133 | POLICY CONTENT |
| PRINTER ACCESS | C | 06/14/00 | 12:13:11.546 | POLICY CONTENT |
| INTERNET ACCESS | A | 05/24/00 | 14:11:05.876 | POLICY CONTENT |
| INTERNET ACCESS | B | 06/10/00 | 09:30:01.123 | POLICY CONTENT |
| NETWORK ACCESS | A | 04/04/00 | 09:31:24.365 | POLICY CONTENT |

SYSTEM FOR SELECTING AND DISSEMINATING ACTIVE POLICIES TO PEER DEVICE AND DISCARDING POLICY THAT IS NOT BEING REQUESTED

GOVERNMENT CONTRACT

The U.S. Government has a paid-up-license in this invention and the right in limited circumstances to require the patent owner to license others on reasonable terms as provided for by the terms of Contract No. F30602-98-C-0012 awarded by the Defense Advanced Research Projects Agency (DARPA).

FIELD OF THE INVENTION

The present invention relates generally to communication systems and, more particularly, to a system and method for selecting and disseminating policies among anonymous peer devices.

BACKGROUND OF THE INVENTION

Conventional methods for communicating information to a set of anonymous peer devices distributed across a network typically include the use of mailboxes or the use of an information bulletin board. Mailboxes allow the anonymous devices to interact through the posting of requests and/or responses to the appropriate mailbox for each given information type, and the monitoring of those mailboxes that are of interest to the device. Similarly, an information bulletin board allows the devices to interact through publishing to the bulletin board and through requests and responses posted to the bulletin board. In some instances, network controllers and administrators use these methods for distributing policies to listening peer devices. These policies may relate, for example, to any part of system administration, network security, command and control, or courses of action. For example, a manager may publish, via a peer device, a new policy relating to Internet access privileges for implementation by the company's firewalls. The firewall controllers in the company's network may implement this policy on the firewalls within their control upon retrieving the policy from a mailbox or bulletin board.

Conventionally, peer devices that communicated instructions to other peer devices could send policies directly to the peers in situations where their identities are known in advance, or in the case of anonymous peers they could place a single 'current' policy in a mailbox or bulletin board for their peers to find. In environments where policies might change rapidly and where it takes time to read and assimilate policies, to insure timely and accurate policy digestion, it may be desirable to keep several policy versions in the mailbox or bulletin board at the same time. As a result, it may be impossible for a peer device wanting the current version of the policy to determine which policy version to implement, and when the peers are anonymous it may be impossible to know which peer to contact for this information.

Therefore, there exists a need for a system and method that facilitate the dissemination of multiple versions of policies among anonymous peer devices and the selection of a currently active version.

SUMMARY OF THE INVENTION

Systems and methods consistent with the present invention address this and other needs by providing a mechanism that ensures that a current version of a policy is implemented.

In accordance with the purpose of the invention as embodied and broadly described herein, a method that ensures policy coherency among a group of peer devices is disclosed. The method includes detecting the addition of a new policy, generating a message containing the newly added policy, and transferring the message to the peer devices.

In another implementation consistent with the present invention, a network includes one or more anonymous peer devices and one or more anonymous policy servers. The one or more peer devices request policies of interest from the one or more policy servers, determine whether a received policy is of a variety in which the one or more peer devices have an interest, and implement the received policy when the policy is the active version of a policy of interest. The one or more policy servers receive the request from the one or more peer devices, determine whether any version of the policy requested exists, and transfer all versions of the policy to the one or more peer devices, indicating the active version, if any version of the policy is determined to exist.

In yet another implementation consistent with the present invention, a computer-readable medium having a database structure is disclosed. The computer-readable medium includes a policy database containing a policy identification field that stores an identifier of a policy, a version field that stores an identifier of a policy version, and a policy contents field that stores the content of the policy version.

In still another implementation consistent with the present invention, a computer-readable medium, having a database structure, includes an active policy database containing a policy identification field that stores an identifier of a policy and a version field that stores an identifier of the currently active policy version.

In another implementation consistent with the present invention, a method for implementing changing policies is disclosed. The method includes receiving a message containing an identifier and one or more versions of a policy. The method further includes determining whether the identifier in the message is in a list of policy identifiers. If the identifier is not in the list, the method discards the message. If the identifier is in the list, the method accepts the one or more versions of the policy and implements the currently active version of the policy.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Implementations consistent with the present invention ensure that anonymous peer devices implement active versions of policies of interest to those devices. The peer devices transmit pull policy requests for each policy of interest whenever they are without a currently active policy (e.g., when they first boot up). In response, a policy server supplies the peer devices with one or more versions of the policies and indicates which version is active. In addition, a policy server will issue push policy requests to all peers as policies in its database change or become active. As a result, the peer devices ensure that they are implementing the active versions of the policies at all times.

The foregoing description relates to the selection and dissemination of policies. It will be appreciated that the term "policy" as described herein may include not only policies relating to, for example, system administration (e.g., policies controlling Internet access for a group of peer devices), network security, command and control, or courses of action, but may also include other types of information in which different versions of the information may exist, such as software programs or instructions. The policies may be in effect for substantial periods of time, or fleetingly during emergencies.

Exemplary Network

Figure 1:
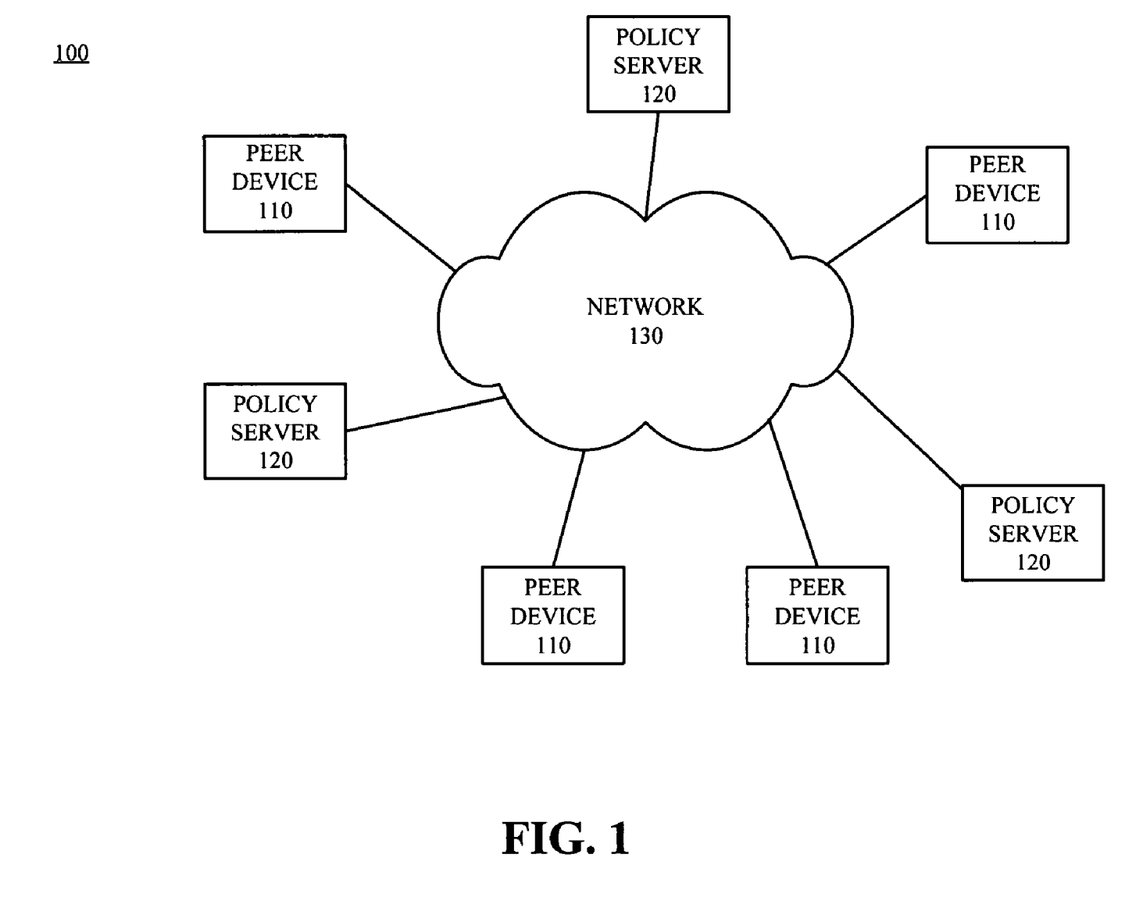
FIG. 1 illustrates an exemplary system in which a system and method, consistent with the present invention, may be implemented.

FIG. 1 illustrates an exemplary system 100 in which a system and method, consistent with the present invention, may be implemented. As illustrated, the exemplary system 100 includes several peer devices 110 and several policy servers 120 interconnected through a network 130. It will be appreciated that a typical system could include more or less devices than are shown in FIG. 1.

The peer devices 10 may include any type of computer system, such as a mainframe, minicomputer, personal computer, laptop, personal digital assistant, and the like, capable of connecting to the network 130. Peer devices 110 may connect to network 130 in any conventional manner, such as via a wired, wireless, or optical connection.

The policy servers 120 may include any type of computer system, such as a mainframe, minicomputer, or personal computer, capable of connecting to the network 130 to enable the policy servers 120 to communicate with the peer devices 10. In alternative implementations, the policy servers 120 may include a mechanism for directly connecting to one or more peer devices 110 or may be included within a peer device 110. The policy servers 120 may transmit data over network 130 or receive data from the network 130 via a wired, wireless, or optical connection.

The network 130 may include one or more conventional networks, such as the Internet, an intranet, a wide area network (WAN), a local area network (LAN), or other similar types of networks.

Exemplary Policy Server

Figure 2:
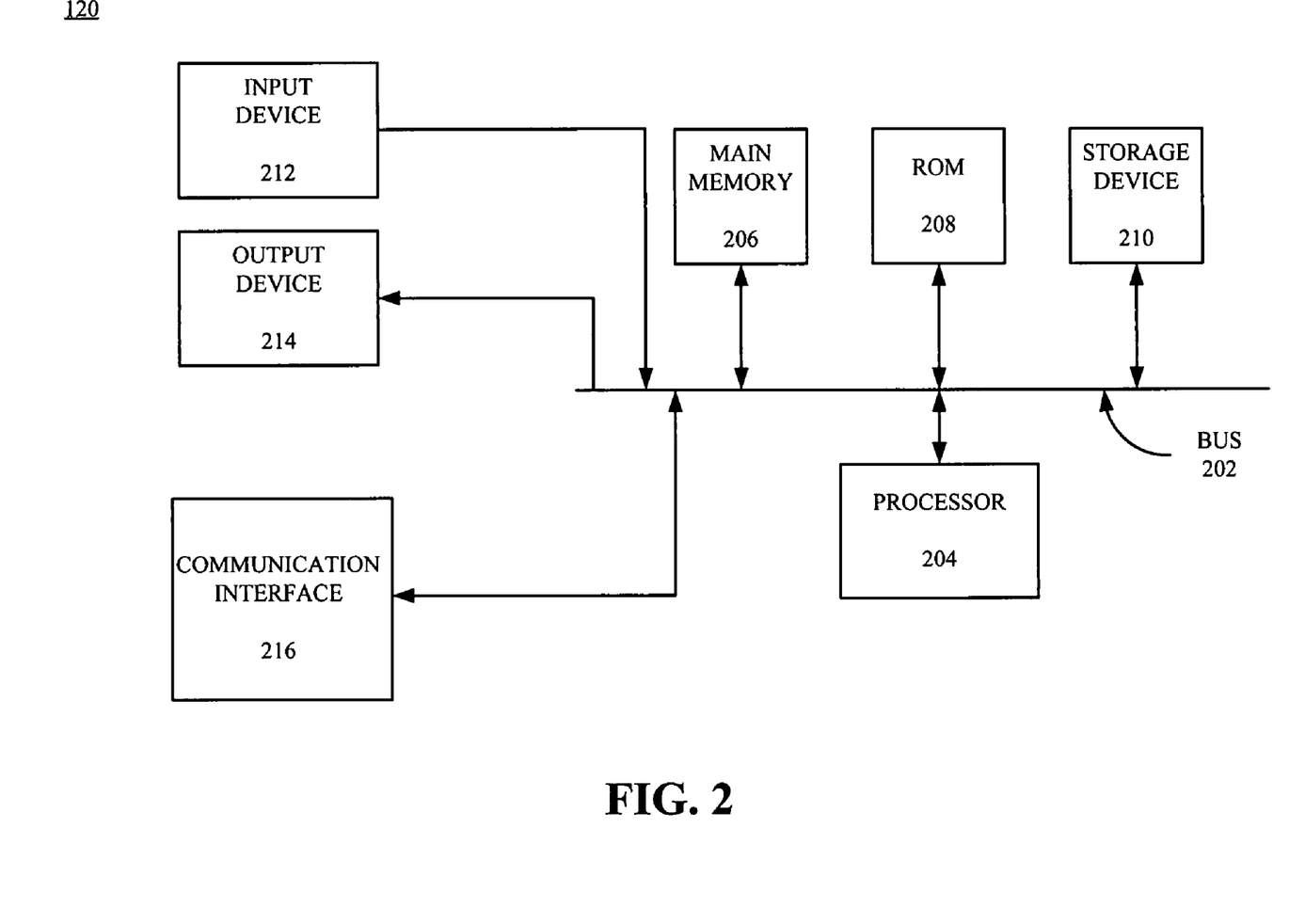
FIG. 2 illustrates an exemplary configuration of a policy server consistent with the present invention.

FIG. 2 illustrates an exemplary policy server 120 consistent with the present invention. In FIG. 2, the policy server 120 includes a bus 202, a processor 204, a main memory 206, a read only memory (ROM) 208, a storage device 210, an input device 212, an output device 214, and a communication interface 216. The bus 202 permits communication among the components of the policy server 120.

The processor 204 may include any type of conventional processor or microprocessor that interprets and executes instructions. The main memory 206 may include a random access memory (RAM) or another type of dynamic storage device that stores information and instructions for execution by the processor 204. Main memory 206 may also be used to store temporary variables or other intermediate information during execution of instructions by processor 204.

ROM 208 may include a conventional ROM device and/or another type of static storage device that stores static information and instructions for processor 204. The storage device 210 may include a magnetic disk or optical disk and its corresponding drive and/or some other type of magnetic or optical recording medium and its corresponding drive for storing information and/or instructions.

The input device 212 may include any conventional mechanism that permits an operator to input information to the policy server 120, such as a keyboard, a mouse, a microphone, a pen, voice recognition and/or biometric mechanisms, etc. The output device 214 may include any conventional mechanism that outputs information to the operator, including a display, a printer, a pair of speakers, etc.

The communication interface 216 may include any transceiver-like mechanism that enables the policy server 120 to communicate with other devices and/or systems, such as peer devices 110, either directly or indirectly through, e.g., mailboxes or an information bulletin board. For example, the communication interface 216 may include a modem or an Ethernet interface to a network. Alternatively, communication interface 216 may include other mechanisms for communicating via a data network, such as network 130.

A policy server 120, consistent with the present invention, ensures that each peer device 110 in the system 100 receives all versions, and implements active versions of the policies it contains that are of interest to a respective device 110 without the policy server 120 needing to know which of the peer devices 110 have an interest it its policies, and without a peer device 110 needing to know which policy server 120 holds the policy types in which it has an interest. The policy server 120 acts in response to processor 204 executing sequences of instructions contained in memory 206. Such instructions may be read into memory 206 from another computer-readable medium (a computer-readable medium may include one or more memory devices or carrier waves), such as a storage device 210, or from a separate device via communication interface 216. Execution of the sequences of instructions contained in memory 206 causes processor 204 to perform the process steps that will be described hereafter. In alternative embodiments, hard-wired circuitry may be used in place of or in combination with software instructions to implement the present invention. Thus, the present invention is not limited to any specific combination of hardware circuitry and software.

A policy server 120, consistent with the present invention, provides policy information to the peer devices 110 from an associated database. The database may be stored at the policy server 120 (e.g., in memory 206) or externally from policy server 120. The policies in the database may change without warning, and the changes may come from any source, including the input device 212 or the communication interface 216.

Figure 3A:
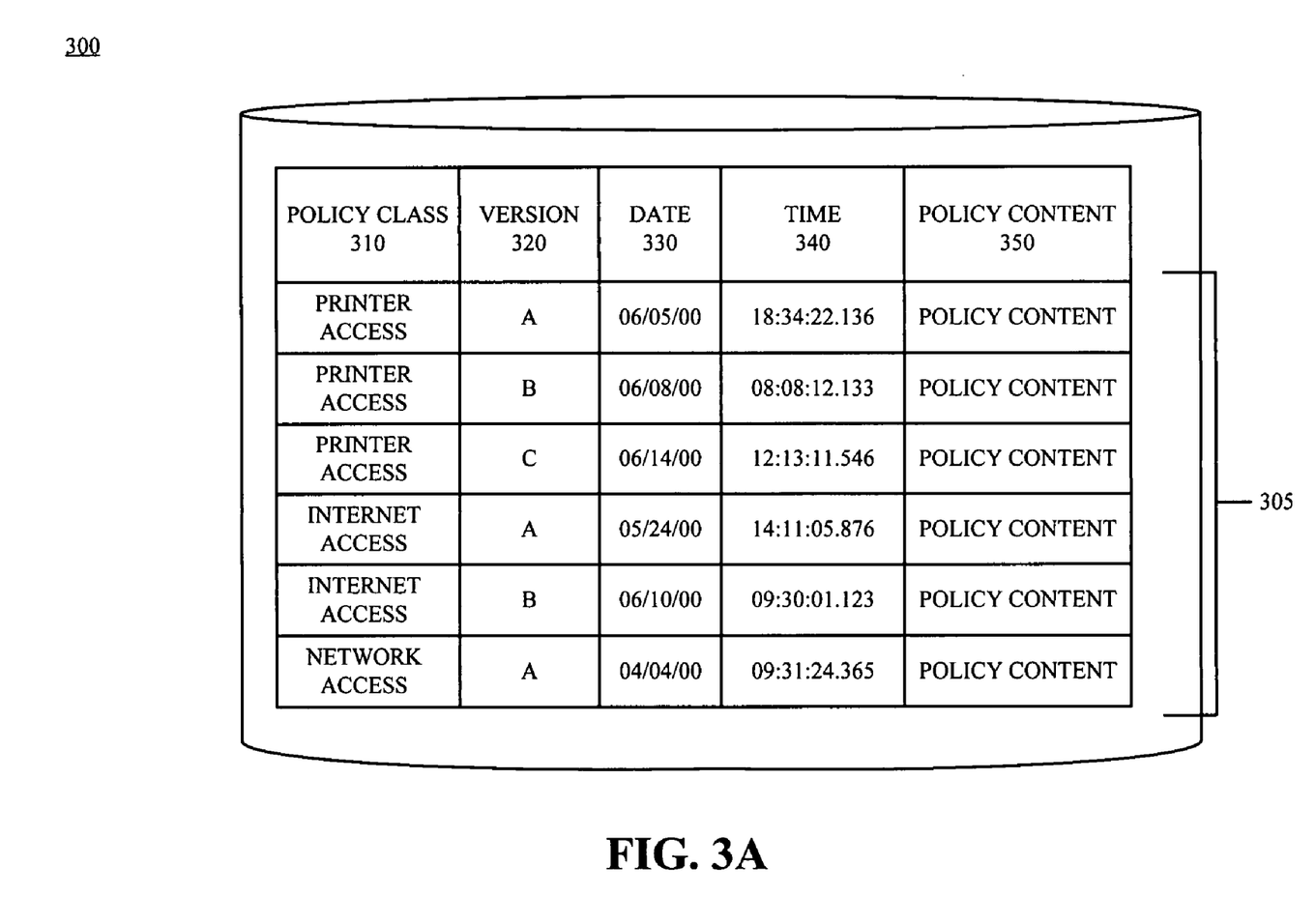
FIG. 3A illustrates an exemplary policy database, consistent with the present invention, that may be associated with the policy server of FIG. 2.
Figure 3B:
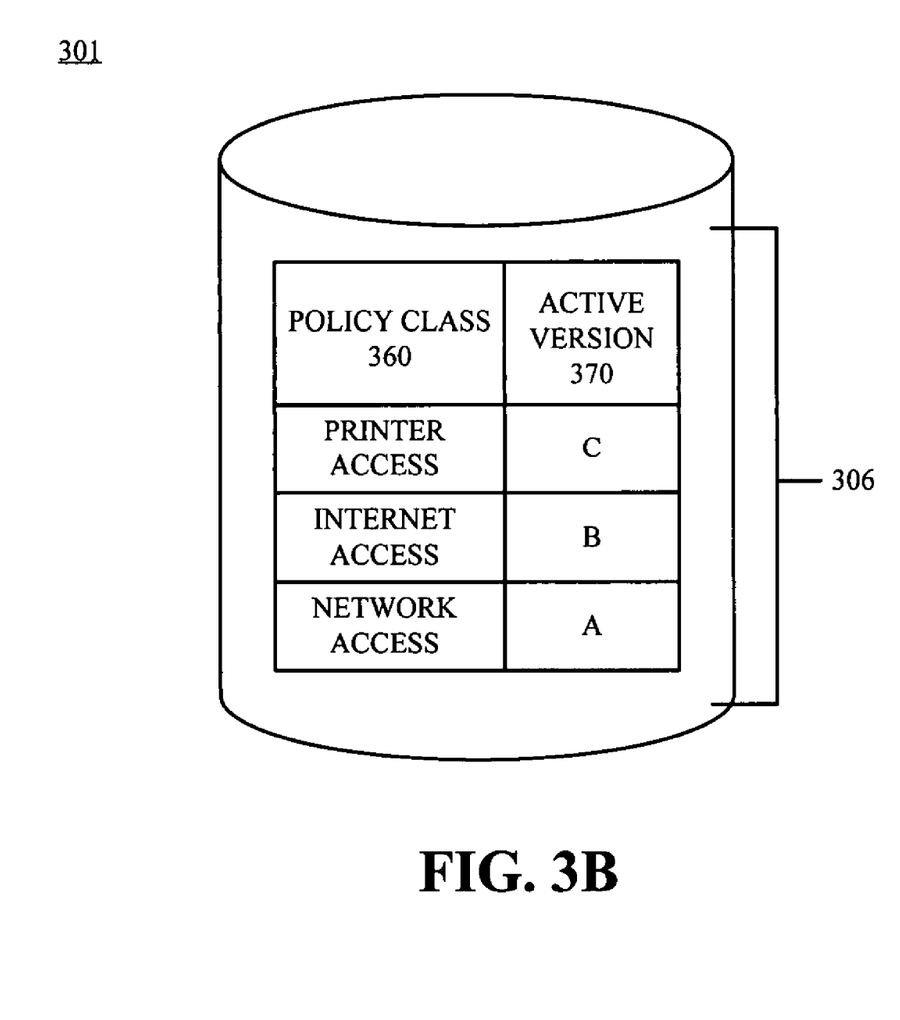
FIG. 3B illustrates an exemplary active policy database, consistent with the present invention, that may be associated with the policy server of FIG. 2.

FIG. 3A and FIG. 3B illustrate two exemplary databases 300 and 301, consistent with the present invention, that may be associated with policy server 120. While only one of each database is described below, it will be appreciated that databases 300 and 301 may each consist of multiple databases stored locally at one or more policy servers 120 or stored at different locations throughout the network 130.

As illustrated in FIG. 3A, database 300 includes a group of entries 305. Each entry 305 includes information stored in one or more of the following exemplary fields: a policy class field 310, a version field 320, a date field 330, a time field 340, and a policy content field 350. The policy class field 310 stores a name or identifier that uniquely identifies the different policies stored in database 300 and referenced in active policy database 301. As illustrated in FIG. 3A, for example, the policy class field 310 may store policies relating to access privileges to a printer, the Internet, and a network. It will be appreciated that any number of other types of policies may be stored in database 300.

The version field 320 stores an identifier that uniquely identifies the different versions of a policy. It will be appreciated that an unlimited number of versions of a particular policy may exist at any one time. The date field 330 stores the date at which the policy version was added to the database 300. The time field 340 stores the time at which the policy version was added to the database 300. One version of a particular policy may be placed into an "active" status by a peer device 110 or by a policy server 120. It will be appreciated that the active version of a policy may, in some instances, be a version other than the most recently added version. The policy content field 350 stores the content of the policy version.

FIG. 3B illustrates an active policy database 301. Database 301 includes a group of entries 306 that includes information stored in one or more of the following exemplary fields: a policy class field 360 and a currently active version field 370. Database 301 may contain additional fields that would aid the policy server 120 in searching and sorting information in the database 300. The policy class field 360 stores a name or identifier that uniquely identifies the different policies stored in database 300. The active version field 370 stores an identifier that uniquely identifies the active version of the policies in the policy class field 360. As illustrated in FIG. 3B, for example, version C of the printer access policy is currently active.

The active policy database 301 allows the policy server 120 to quickly determine whether a particular policy exists and whether an active version of the policy exists since it contains only one entry (indicating the active version) for each class of policy stored in database 300 no matter how many versions of a class of policy are stored in the policy database 300.

Exemplary Peer Device

Figure 4:
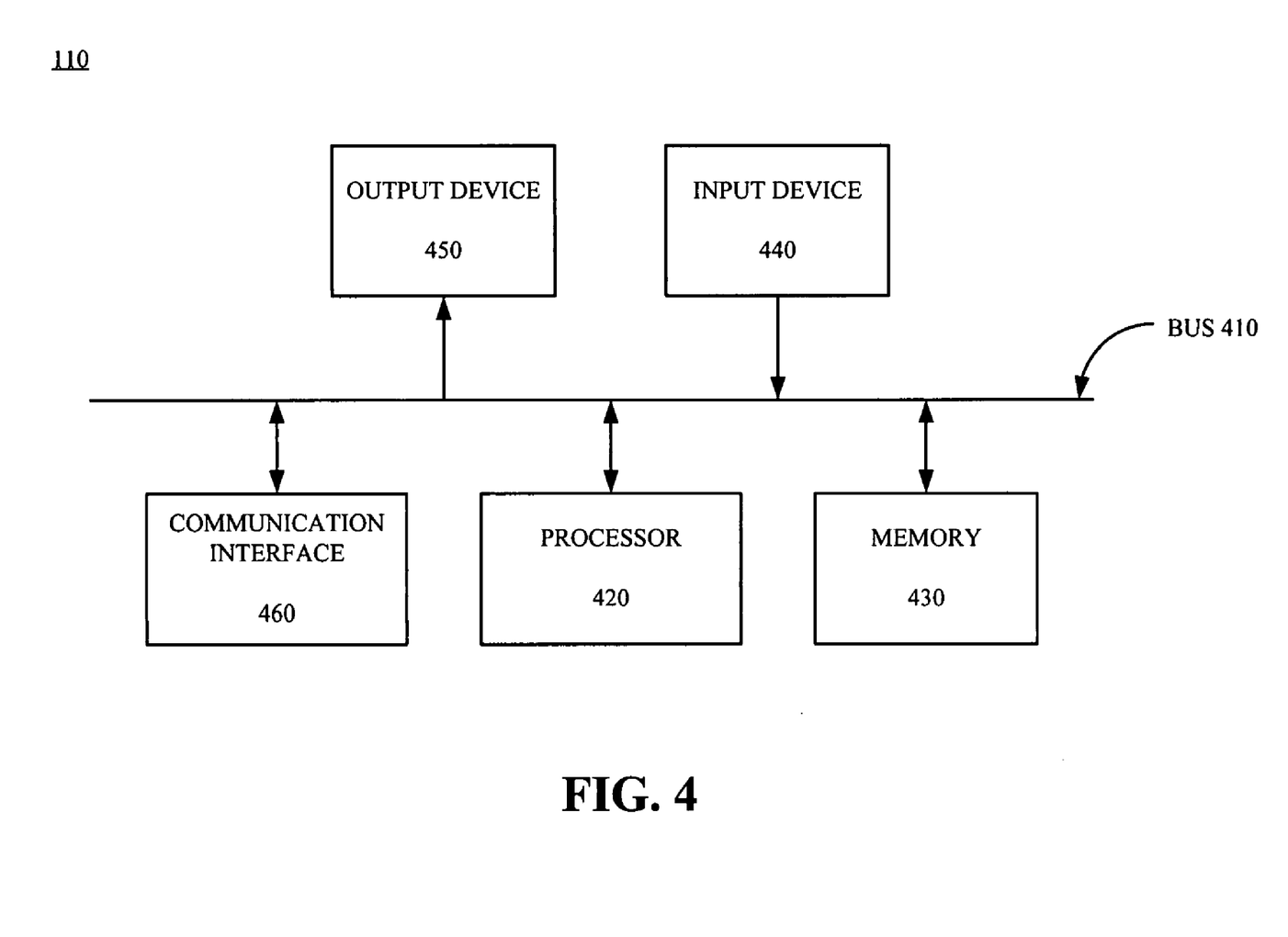
FIG. 4 illustrates an exemplary configuration of a peer device consistent with the present invention.

FIG. 4 illustrates an exemplary peer device 110 consistent with the present invention. The peer device 10 includes a bus 410, a processor 420, a memory 430, an input device 440, an output device 450, and a communication interface 460. The bus 410 permits communication among the components of the peer device 110.

The processor 420 may include any type of conventional processor or microprocessor that interprets and executes instructions. The memory 430 may include a RAM or another type of dynamic storage device that stores information and instructions for execution by the processor 420; a ROM or another type of static storage device that stores static information and instructions for use by the processor 420; and/or some other type of magnetic or optical recording medium and its corresponding drive.

The input device 440, if present, may include any conventional mechanism that permits an operator to input information to the peer device 110, such as a keyboard, a mouse, a pen, voice recognition and/or biometric mechanisms, and the like. The output device 450 may include any conventional mechanism that outputs information to the operator, including a display, a printer, a pair of speakers, etc. The communication interface 460 may include any transceiver-like mechanism that enables the peer device 110 to communicate with other devices and/or systems. For example, the communication interface 460 may include mechanisms for communicating with other peer devices 110 or the policy server 120 via a network, such as network 130 (FIG. 1).

Similar to the policy server 120 described above, the peer device 110 may include a policy database and an active policy database. The policy database may contain all versions of all policies of interest to the peer device 110 that it has received from at least one policy server 120. The active policy database may contain a list of all policy classes of interest along with an indication of whether any policy of that class has been received, and if so which version of the policy is currently active. The active policy database allows the peer device 110 to quickly determine which previously stored version of a particular policy is being implemented, and whether this is its default version that it uses in the absence of receipt of any other version from a policy server 120. The policy database and active policy database may be stored, for example, in memory 430.

Execution of the sequences of instructions contained in memory 430 causes processor 420 to perform the functions described below. In alternative embodiments, hard-wired circuitry may be used in place of or in combination with software instructions to implement the present invention. Thus, the present invention is not limited to any specific combination of hardware circuitry and software.

Exemplary Processing

Figure 5:
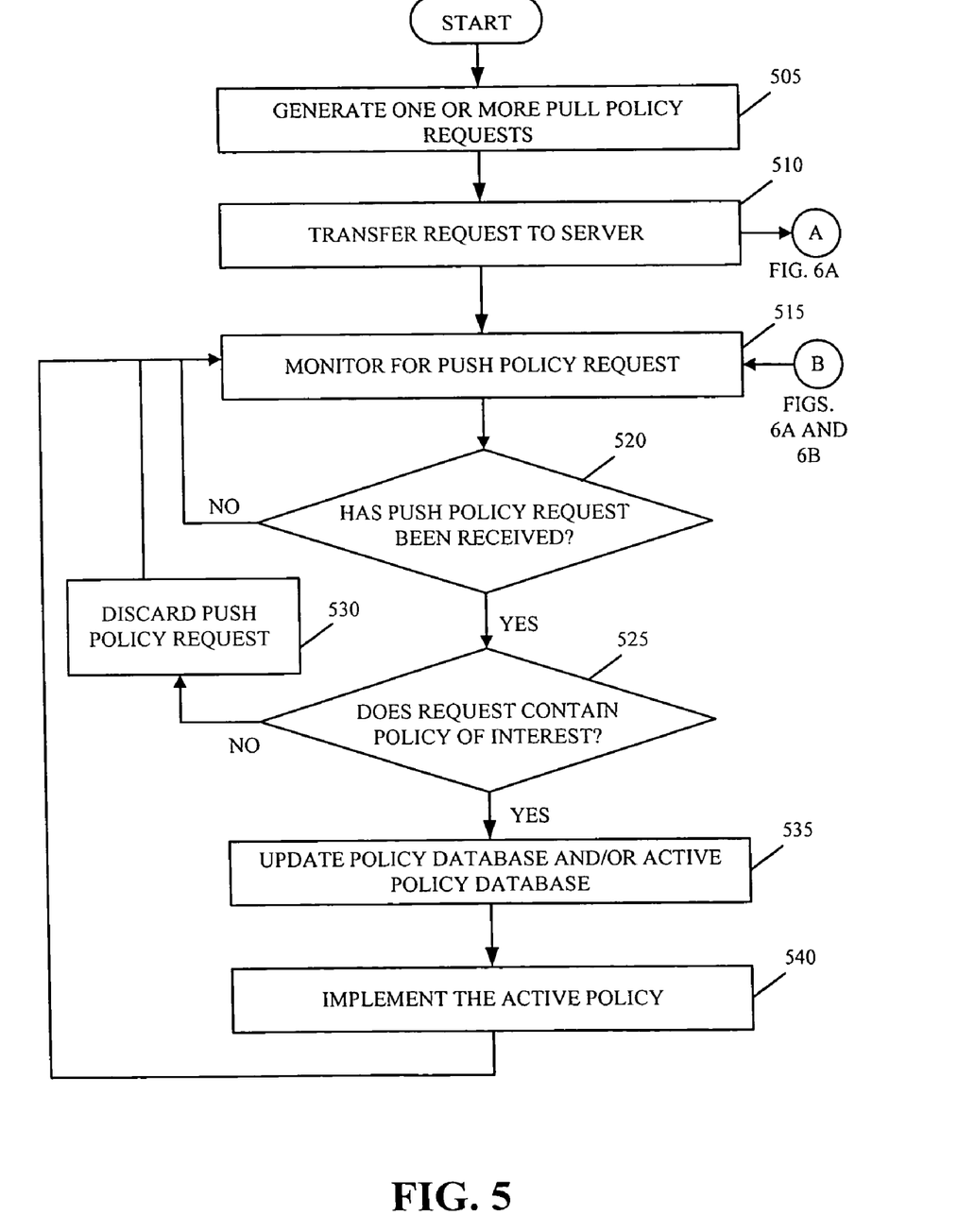
FIG. 5 illustrates an exemplary process, consistent with the present invention, for ensuring that a peer device receives and implements an active version of a particular policy.

FIG. 5 illustrates an exemplary process, consistent with the present invention, for ensuring that a peer device, such as peer device 110 (FIG. 1), receives and implements the active version of a particular policy of interest to that device. At startup, the peer device 110 fills its policy database with "default" versions of each policy contained in the peer device 110 and fills its active policy database with an indication of which version of the policy it is using.

To ensure that the peer device 110 receives the currently active version of these policies, the device 110 generates a pull policy request for each of the policy classes in the active policy database [step 505]. Each pull policy request contains a policy class identifier that identifies the policy for which the request is sent. Alternatively, a single pull policy request may be generated for all of the policy classes desired.

Assume, for example, that the peer device 110 contains a policy that limits access to a computer resource, such as a printer, to certain periods of the day. To ensure that the peer device 110 has an active version of the printer access policy, the device 110 generates, for example, at startup, a pull policy request that identifies the printer access policy. The peer device 110 then transfers the pull policy request to one or more policy servers 120 [step 510].

After transferring a pull policy request to one or more policy servers 120, the peer device 110 may, periodically thereafter, monitor for the receipt of one or more push policy requests [step 515]. If a push policy request is received [step 520], the peer device 110 determines whether the push policy request contains one of the policy classes requested [step 525]. For example, the peer device 110 may determine whether the push policy request contains the printer access policy by comparing the policy identifier in the push policy request to the list of identifiers in the peer device's 110 policy database.

If the request does not contain a policy of interest, the peer device 110 discards the push policy request [step 530]. Processing then returns to step 515. If, on the other hand, the request contains a policy of interest, the peer device 110 updates its policy database and/or its active policy database to indicate the active version of the policy [step 535]. The peer device 110 may then implement the active policy contained in the push policy request [step 540]. The implementation may be performed automatically by peer device 110 or through operator intervention. The peer device 110 may thereafter continue to monitor for push policy requests [step 515].

Figure 6A:
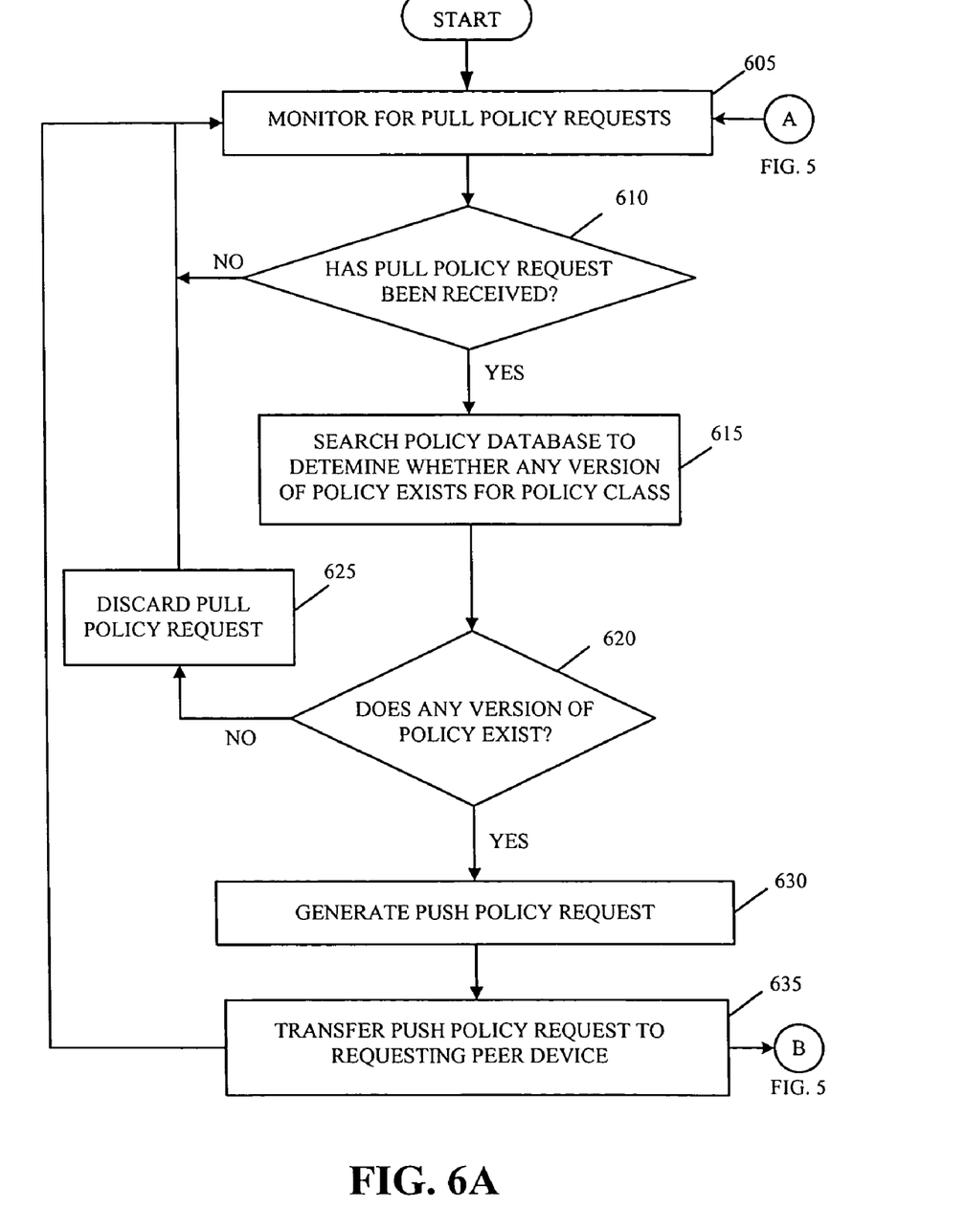
FIGS. 6A and 6B illustrate exemplary processing of a policy server consistent with the present invention.
Figure 6B:
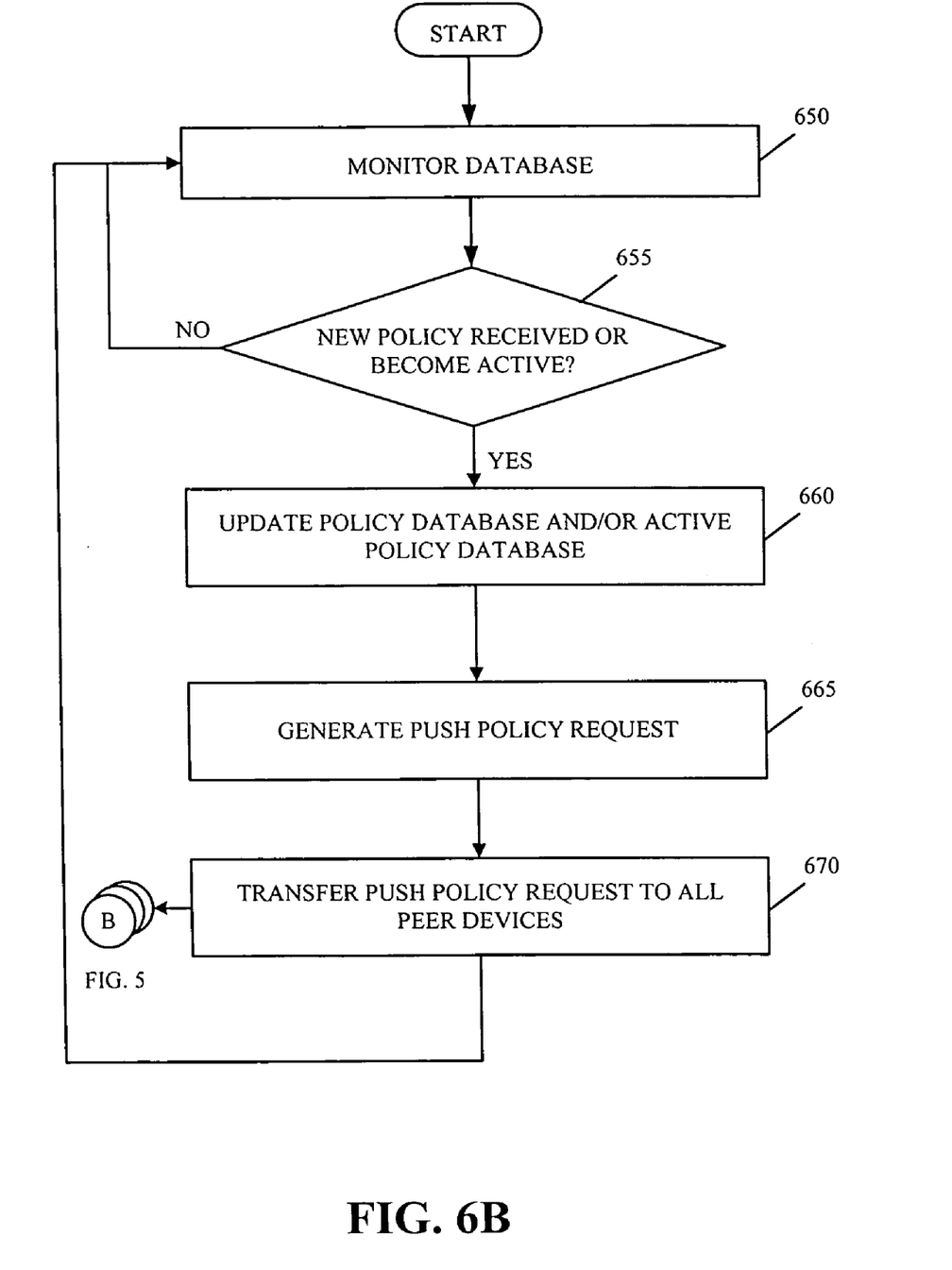

FIGS. 6A and 6B illustrate exemplary processing of a policy server 120 consistent with the present invention. Processing begins with the policy server 120 monitoring for pull policy requests [step 605]. As described above with respect to FIG. 5, pull policy requests may be generated by and transferred to a policy server 120 from one or more peer devices 110. Once a pull policy request has been received [step 610], the policy server 120 determines the policy class (or classes) of interest to the peer device 110 that sent the request by examining the policy identifier contained in the request [step 615]. In the example described with respect to FIG. 5, the policy server 120 would identify the request as being directed to the printer access policy. The policy server 120 searches through its policy database 300 for the policy class to determine whether any version of the policy exists [step 615]. This search may be performed through a comparison operation.

If the policy server 120 determines that no version of the policy exists in the policy database 300 [step 620], the policy server 120 discards the pull policy request [step 625] and processing returns to step 605. If, on the other hand, one or more versions of the policy exists in the policy database 300 [step 620], the policy server 120 generates a push policy request [step 630]. The push policy request contains a policy identifier, the policy that the peer device 110 requested, and an indication of the active version of the policy. In the example above, the push policy request would contain the policy identifier "printer access" and the active version of the printer access policy (version C in FIG. 3A).

If more than one version of the requested policy exists in database 300, the policy server 120 may transfer all versions to the peer device 110 with an indication of which of the versions is the currently active version. The policy server 120 then transfers the push policy request to the requesting peer device 110 [step 635].

After transferring the push policy request to the requesting peer device 110, processing returns to step 605 where the policy server 120 monitors for new pull policy requests.

At any time during the above-described processing, a particular version of a policy in the policy server's database 300 may be placed in an active status or a new policy may be added by a peer device 110 or by an operator of the policy server 120. Whenever this happens, the policy server 120 generates a push policy request for this now active or new policy to be transmitted to all peer devices 110. This processing is described with respect to FIG. 6B.

At startup, the policy server 120 may search its associated policy database 300 for policies that it wants and/or add its own policies. This may occur, for example, when the policy server 120 acts as both a policy server and peer device. The policy server 120 then monitors the policy database 300 for the addition of new policies or changes as to which version of a policy is currently active [step 650] (FIG. 6B). When the policy server 120 determines that a new policy version has become active or that a new policy has been added [step 655], the policy server 120 updates its policy database 300 and/or its active policy database 301 [step 660]. As described above, the active policy database 301 contains a listing of the currently active versions of all of the policy classes in database 300. The policy server 120 may make the determination that a new policy version has become active by monitoring changes to the active version field 370 of database 301.

The policy server 120 then generates a push policy request [step 665]. The policy server 120 includes the newly received or newly active policy version(s) in the push policy request. The policy server 120 transfers this push policy request to all the peer devices 110 in the system 100 [step 670]. As a result, the policy server 120 ensures that any peer devices 110 that implement this policy have the current versions and currently active version of the policy. Moreover, this allows the policy server 120 to know which peer devices 110 have which policies. The policy server 120 may then return to monitoring the policy database 300 [step 650].

CONCLUSION

A system and method consistent with the present invention provide a process that enables a set of policies being implemented in a system to be quickly and easily changed, even when multiple versions of the policies must coexist and even when the peer devices are anonymous. By automatically providing each peer device of the system with the most current versions of the policy, even before they become active, the present invention ensures that changes to policies are quickly implemented.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps has been presented with respect to FIGS. 5, 6A, and 6B, the order of the steps may be altered in other implementations consistent with the present invention.

The scope of the invention is defined by the following claims and their equivalents.

What is claimed is:

1. A method for distributing policies in a network having at least one anonymous policy server and at least one anonymous peer device, comprising:
   requesting a policy from the anonymous policy server;
   determining, via the anonymous policy server, whether an active version of the policy exists;
   transferring, when an active version of the policy is determined to exist, the active policy version from the anonymous policy server to the anonymous peer device;
   receiving, via the anonymous peer device, a policy;
   determining whether the received policy is the requested policy;
   discarding the received policy when the received policy is not the requested policy; and
   implementing the received policy when the received policy is the requested policy.

2. The method of claim 1 wherein the requesting includes:
   generating, via the anonymous peer device, a policy request, the policy request containing a policy identifier; and
   transferring the policy request to the anonymous policy server.

3. The method of claim 2 wherein the determining whether an active version of the policy exists includes:
   comparing the identifier in the policy request to a list of active policy identifiers.

4. A network comprising:
   at least one anonymous peer device configured to:
      request a policy from at least one anonymous policy server,
      determine whether a received policy is of a desired policy class,
      implement the received policy when the received policy is an active policy of the desired policy class, and
      discard the received policy when the received policy is not of the requested policy class; and
   at least one anonymous policy server configured to:
      receive the request from the at least one anonymous peer device,
      determine whether any version of the policy requested exists, and
      transfer all versions of the policy to the peer device, indicating the active version, if any version is determined to exist.

5. The network of claim 4 wherein, when requesting, the at least one anonymous peer device is configured to:
   generate a policy request, the policy request containing an identifier that identifies the requested policy, and
   transfer the policy request to the at least one anonymous policy server.

6. The network of claim 4 wherein, when determining, the at least one anonymous policy server is configured to:
   compare the identifier in the policy request to a list of active policy identifiers.

7. A method for implementing policies, comprising:
   receiving a message, the message containing an identifier and one or more versions of a policy;
   determining whether the identifier is in a list of policy identifiers;
   discarding the message when the identifier is absent from the list; and
   implementing an active version of the one or more policies when the identifier is present in the list.

8. A system for implementing policies comprising:
   a memory configured to store instructions and an active policy database, the active policy database containing a list of policy identifiers; and
   a processor configured to execute the instructions to receive a message, the message containing an identifier and one or more versions of a policy, compare the identifier to the list of policy identifiers, discard the message when the identifier does not match a policy identifier in the list, and implement an active version of the policy when the identifier matches a policy identifier in the list.

* * * * *